Aug. 13, 1935. W. KELLY 2,011,448
METHOD OF WELL CONSTRUCTION
Filed June 4, 1934   2 Sheets-Sheet 2
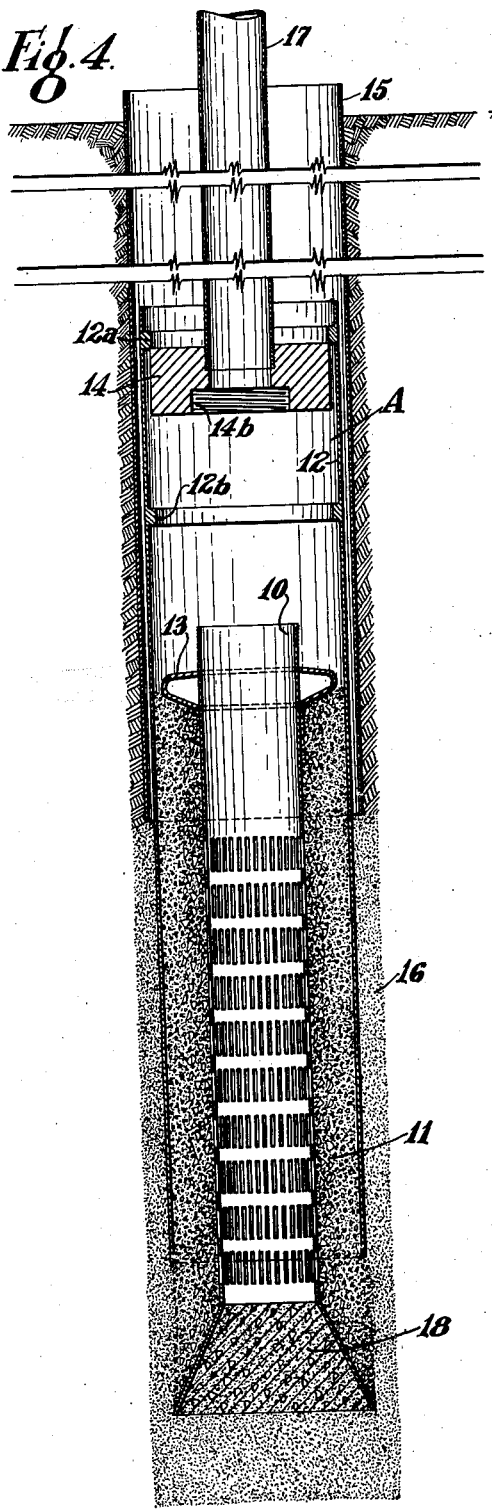
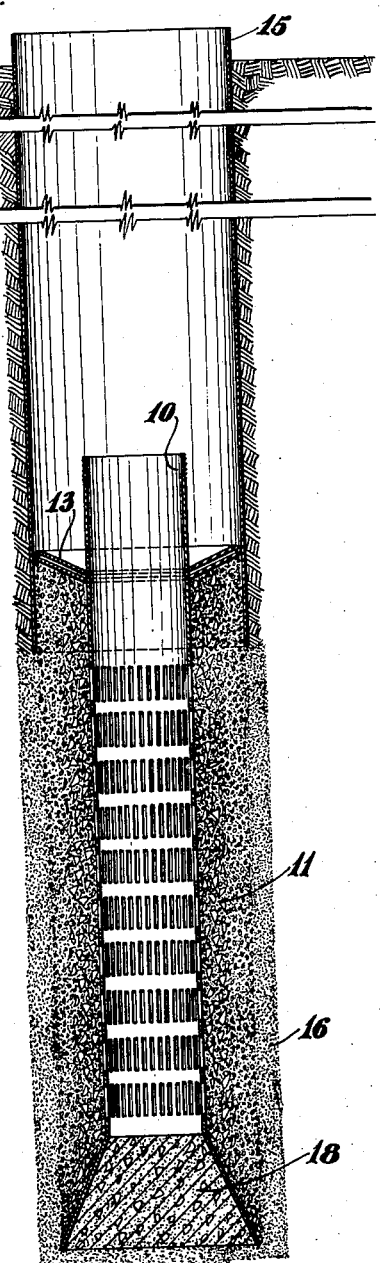
INVENTOR.
William Kelly.
BY
R. M. Cooper
ATTORNEY.

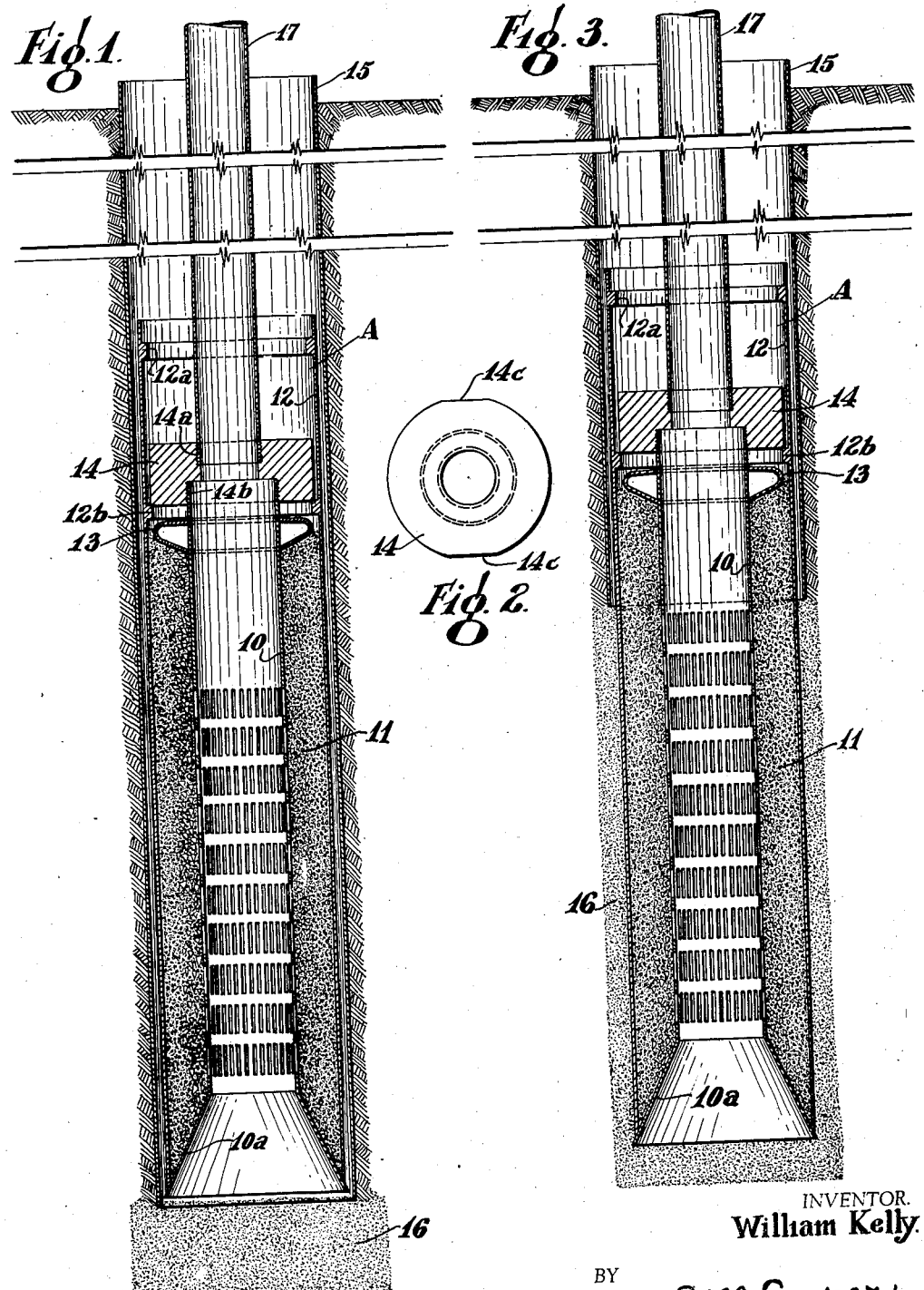

Patented Aug. 13, 1935

2,011,448

UNITED STATES PATENT OFFICE 2,011,448

METHOD OF WELL CONSTRUCTION

William Kelly, Grand Island, Nebr.

Application June 4, 1934, Serial No. 728,824

9 Claims. (Cl. 166—21)

This invention relates to a method of well construction.

In the construction of wells, particularly in the larger sizes, it is common practice to surround the well screen with a filtering envelope composed of suitable filtering material such as sand and gravel. When properly constructed, the filtering envelope permits the use of a coarser screen less susceptible to clogging, and increases the capacity of the well by presenting a greater area of straining surface to the fluid-bearing strata. In the general run of wells, the best results are obtained with an envelope composed of graduated particles running from fine to coarse placed in position in a mixed condition with the average size of the particles decreasing with the distance from the screen. For example, an envelope for use in a fluid strata containing fine sand may comprise an inner layer of gravel and coarse sand immediately surrounding the screen and an outer layer of coarse and fine sand. In such an envelope, the size of the gravel should exceed the openings in the screen, and the size and arrangement of particles in the different layers should be be such as to result in an interlocking engagement whereby the finer particles are restrained from moving through the coarser particles. In addition, the size of the two grades of sand and their arrangement in the outer layer should result in the formation of interstices of a size to prevent the passage therethrough of the fine sand in the fluid-bearing strata.

The construction of an envelope for a particular well will of course depend upon a number of factors including the side of the well and the nature of the fluid-bearing strata.

Various methods have been used in well construction for placing a filtering envelope around a well screen. In accordance with one method a casing larger than the screen is sunk to the required depth of the well. The screen is then set in place and the annular space between the outer casing and the screen filled with filtering material. The casing is then moved upward to a position where its bottom end coincides with the top of the screen. This method produces a symmetrical filtering envelope around the well screen, but trouble has been experienced with this type of construction where fine sand is present in the strata and the filtering envelope, to serve its purpose efficiently, must be composed of different sizes of filtering material. The trouble experienced arises from the different types of filtering material becoming separated in falling through the water at the bottom of the well, the larger and heavier particles reaching the bottom first and forming a layer, and the smaller and lighter particles following forming a superimposed layer.

In accordance with a second method of well construction a well tube is first sunk to the top of the water-bearing strata. After this a screen, smaller in diameter than the well tube, and formed with a bell-shaped bottom of substantially the same diameter as the well tube, is lowered to the bottom of the well tube. The annular space between the screen is then filled with filtering material forming a cylindrical filtering pack resting on the bell-shaped bottom of the screen. Following the insertion of the filtering material, the screen is lowered into the water-bearing strata by bailing the sand out of the bottom of the well, the filtering pack following the screen. This method has been followed in certain instances with a fair degree of success, but in other instances it has been unsuccessful due to the filtering envelope being disturbed or entirely separated from the screen by caving or boiling within the water-bearing strata.

Under a third method of well construction a double screen filled with filtering material is sunk below the well casing. Through the use of this method the filtering envelope is not disturbed, but a disadvantage is incurred in that there are two screens to stop up and give trouble instead of one. Moreover, a well produced by this method is not in a true sense a filter-packed well since the outer screen is exposed to the water-bearing strata.

It is the object of this invention to provide an improved method of well construction which, while involving the use of but a single screen, insures the attainment of a filtering envelope of the character desired within the well.

The invention will be understood from the description of the embodiment thereof illustrated in the accompanying drawings, in which:

Figures 1, 3, and 4 are sectional views illustrating in sequence different steps in a method of constructing a well, Figure 2 is a top plan view of a member employed in the construction of the well, and Figure 5 is a sectional view of the completed well.

The method illustrated in the drawings involves the construction outside of the well of a unit A (see Figure 1) consisting of a well screen 10 constructed with a rigidly attached cutting-shoe 10a, a filtering envelope 11, a retaining shell 12 formed with an upper band 12a and a lower band 12b, a lead packer-ring 13, and a lock-ring 14 formed at its upper end with right-hand threads 14a and at its lower end with left-hand threads 14b. The lock-ring 14 is constructed with a diameter slightly larger than the internal diameter of the bands 12a and 12b in order to engage therewith as hereafter explained, and for the purpose of permitting its insertion between such bands is formed with flattened outer surfaces 14c.

In the assembly of the unit A, the screen 10 is set in an upright position with the cutting-shoe 10a at its lower end, and the retaining shell 12 placed over the screen and carefully centered so as to form a true annular space between the two parts. The annular space between the screen 10 and the retaining shell 12 is then filled with a filtering material consisting of gravel, or sand and gravel, graded and mixed as may be required by the nature of the fluid-bearing strata. In cases in which it is desirable to use different layers of filtering material, as for instance a layer of gravel and coarse sand adjacent the screen, and an outer layer of coarse and fine sand, the result may be achieved by inserting a dividing cylinder between the screen and the shell, filling in the different layers of filtering material and withdrawing the dividing cylinder. Following the insertion of the filtering material the lead packer-ring 13 is placed on top of such material, and the lock-ring 14 inserted between the bands 12a and 12b of the shell 12 by turning it into a vertical position with surfaces 14c parallel to the side of the shell. The lock-ring 14 is then turned on to the upper end of the screen bringing its lower surface into engagement with the band 12b and locking the screen 10 and the outer shell 12 together, such operation completing the assembly.

In carrying out the method illustrated in the drawings, a well casing 15 is first sunk into the ground to the level of the water-bearing strata 16, and cleaned out to its bottom. The unit A is then lowered to the bottom of the casing 15 by means of a pipe 17 screwed into the upper end of the lock-ring 14, the pipe being extended during the process by adding sections to the initial section as needed. When the unit A has been lowered to the bottom of the casing 15, as illustrated in Figure 1, the sand beneath the cutting-shoe 10a is removed through the pipe 17 by means of a sand bucket or other suitable apparatus causing the unit to sink below the well casing into the fluid-bearing strata 16. After the unit A has been sunk below the casing 15 into the fluid-bearing strata to the depth desired, as illustrated in Figure 3, the bottom of the screen 10 is sealed by depositing therein a layer of concrete 18 through a small pipe inserted from the top of the wall.

Following the sealing of the lower end of the screen 10, the pipe 17 is turned to the right unscrewing the lock-ring 14 from the top of the screen, the turning movement having no affect on the right-handed threaded connection between the pipe 17 and the lock-ring 14 except possibly to tighten the same. After the lock-ring 14 has been unscrewed from the top of the screen 10, the pipe 17 is moved upward until the lock-ring 14 engages the upper band 12a of the retaining shell 12. The pipe 17 is then withdrawn from the well carrying with it the ring 14 and the shell 12, the shell 12 in its upward movement leaving the filtering envelope in ground strata in a substantially unaltered condition. See Figure 4 which illustrates an initial stage in the withdrawal and Figure 5 which shows the well in completed form.

After the withdrawal of the pipe 17 and the shell 12, the lead packer-ring 13 is swedged out against the well casing 15, by means of apparatus inserted from the top of the well, forming a permanent sand-tight joint between the screen 10 and casing 15. This operation completes the well which then has the form illustrated in Figure 5.

It is to be understood that the method of attaining a filtering construction through the use of a screen, a filtering envelope, and an outer shell as set forth in the foregoing, is not limited to the described method of well construction, but can be employed with other methods of well construction involving different procedures in installing the unit and in placing and installing other parts.

It is to be understood that the terminology employed in the description of parts and procedure is not intended to be restrictive, and it is to be understood that various modifications in structure and procedure can be made both in the described method of well construction and in the included method of attaining a filtering construction without departing from the spirit or scope of the appended claims.

I claim as my invention:

1. The method of constructing a well which comprises sinking a casing to the depth of the fluid-bearing strata, sinking below the aforesaid casing within the fluid-bearing strata a unit comprising a hollow screen, a filtering envelope, and an outer shell for retaining the filtering envelope in place about said screen, and withdrawing said outer shell.

2. The method of constructing a well which comprises sinking a casing to the depth of the fluid-bearing strata, sinking below the aforesaid casing within the fluid-bearing strata a unit comprising a hollow screen, a filtering envelope, and an outer shell for retaining the filtering envelope in place about said screen, sealing the bottom of said screen, and withdrawing said outer shell.

3. The method of constructing a well which comprises sinking a casing to the depth of the fluid-bearing strata, sinking below the aforesaid casing within the fluid-bearing strata a unit comprising a hollow screen, a filtering envelope, and an outer shell for retaining the filtering envelope in place about said screen, sealing the bottom of said screen, withdrawing said outer shell, and constructing a connection between said casing and said screen at top of said filtering envelope for restraining upward movement of the material composing said filtering envelope.

4. In the construction of a well, the method of obtaining a filtering envelope about a well screen which comprises constructing outside of the well a unit consisting of the well screen, a filtering envelope surrounding said screen, and an outer shell for retaining the filtering envelope in position about said screen, installing the aforesaid unit within the fluid-bearing strata of the well, and withdrawing the outer shell of said unit.

5. In the construction of a well, the method of obtaining a filtering construction in connection with the well casing which comprises installing below the well casing a unit comprising a hollow screen, a filtering envelope surrounding said screen, and an outer shell for retaining the filtering envelope in position about said screen, sealing the bottom of said screen, and withdrawing said outer shell.

6. In the construction of a well, the method of obtaining a filtering construction in connection with the well casing which comprises installing below the well casing a unit comprising a hollow screen, a filtering envelope surrounding said screen, and an outer shell for retaining the filtering envelope in position about said screen, sealing the bottom of said screen, withdrawing said outer shell, and constructing a connection between the well casing and said screen at the top of said filtering envelope for restraining upward movement of the material composing said filtering envelope.

7. In the construction of a well, the method of obtaining a filtering construction in connection with the well casing which comprises installing below the well casing a unit comprising a hollow screen, a filtering envelope surrounding said screen, and an outer shell for retaining the filtering envelope in position about said screen, withdrawing said outer shell, and constructing a connection between the well casing and said screen at the top of the filtering envelope for restraining upward movement of the material composing said filtering envelope.

8. In the construction of a well, the method of obtaining a filtering construction in connection with the well casing which comprises installing below the well casing in completed form a unit comprising a hollow screen, a filtering envelope surrounding said screen, and an outer shell for retaining the filtering envelope in position about said screen, and withdrawing said outer shell.

9. In the construction of a well, the method of obtaining a filtering structure in connection with the well casing which comprises constructing outside of the well a unit comprising a well screen, a filtering envelope surrounding said screen, and an outer shell for retaining a filtering envelope in position about said screen, installing the aforesaid unit below the well casing within the fluid-bearing strata of the well, withdrawing said outer shell, and constructing a connection between the well casing and said screen at the top of said filtering envelope for restraining upward movement of the material composing said envelope.

WILLIAM KELLY.